United States Patent
Kimelfeld et al.

(10) Patent No.: US 9,817,810 B2
(45) Date of Patent: *Nov. 14, 2017

(54) SVO-BASED TAXONOMY-DRIVEN TEXT ANALYTICS

(71) Applicant: International Business Machines Corporation, Armonk, NY (US)

(72) Inventors: Benny Kimelfeld, Cuptertino, CA (US); Yunyao Li, San Jose, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 13/671,213

(22) Filed: Nov. 7, 2012

(65) Prior Publication Data

US 2014/0129211 A1    May 8, 2014

(51) Int. Cl.
*G06F 17/27*    (2006.01)

(52) U.S. Cl.
CPC .................. *G06F 17/271* (2013.01)

(58) Field of Classification Search
CPC ...................................................... G06F 17/02
USPC ................................................. 704/1, 9, 10
See application file for complete search history.

(56) References Cited

U.S. PATENT DOCUMENTS

| | | | |
|---|---|---|---|
| 5,225,981 A * | 7/1993 | Yokogawa ........................ 704/2 |
| 5,694,559 A * | 12/1997 | Hobson et al. ............... 715/705 |
| 6,405,162 B1 * | 6/2002 | Segond et al. .................... 704/9 |
| 6,778,970 B2 * | 8/2004 | Au ................................. 706/55 |
| 8,359,191 B2 * | 1/2013 | Chen et al. ........................ 704/9 |
| 8,660,969 B1 * | 2/2014 | Hall et al. ........................ 706/12 |
| 9,465,790 B2 * | 10/2016 | Kimelfeld ............ G06F 17/271 |
| 2005/0108001 A1 | 5/2005 | Aarskog |
| 2006/0069589 A1 * | 3/2006 | Nigam et al. ..................... 705/1 |
| 2009/0326926 A1 | 12/2009 | Landau et al. |
| 2011/0106807 A1 | 5/2011 | Srihari et al. |
| 2011/0246181 A1 | 10/2011 | Liang et al. |

FOREIGN PATENT DOCUMENTS

| | | |
|---|---|---|
| KR | 2007008490 | 1/2007 |
| TW | 200529014 | 9/2005 |

OTHER PUBLICATIONS

Khoury et al., A Methodology for Extracting and Representing Actions in Texts, 2006 IEEE International Conference on Fuzzy Systems, Jul. 16-21, 2006.

* cited by examiner

*Primary Examiner* — Jesse Pullias
(74) *Attorney, Agent, or Firm* — Lieberman & Brandsdorfer, LLC

(57) ABSTRACT

Textual data is organized into statement clusters. Sentences are extracted from textual data and parsed. A verb usage pattern is identified and an SVO triplet is determined. The SVO triplet is compared to a taxonomy associated with the domain of the data and a sentiment is derived. A statement cluster is constructed comprising a higher level SVO triplet sensitive to the taxonomy and verb usage pattern, as well as the derived sentiment. Accordingly, the statement clusters may be organized by grouping.

16 Claims, 8 Drawing Sheets

SVO-BASED TAXONOMY-DRIVEN TEXT ANALYTICS

BACKGROUND

This invention relates to autonomously categorizing textual data. More specifically, statements are extracted from the textual data and classified based on a taxonomy.

Text analytics is essential for the understanding of unstructured and semi-structured data. Standard methods are used to classify and categorize large amounts of textual data e.g. call-center data. A conventional approach towards text analysis includes a determination of relevant facts to be extracted from a source e.g. a company name, or stock price, a determination of a relationship shared by the relevant facts, and the development of extractors to extract the predefined facts and relationships from the source. With this approach, it is difficult to predetermine relevant facts and relationships.

Some text analytics utilize a parse tree generated for each sentence to extract data from a source. The text analytics are based on their word form without disambiguation or further classification. Specifically, verb usage is not disambiguated to ascertain different meanings or classify the facts or relationships into different categories. Accordingly, a complete understanding of the sentiment from the extracted data cannot be attained.

BRIEF SUMMARY

This invention comprises a system, and computer program product for categorizing textual data.

In one aspect, a computer program product is provided to the classify sentences from textual data. The computer program product is provided with a computer readable storage medium having computer readable program code embodied therewith. When executed by a processor, the computer readable program code receives textual data, and analyzes the received data. More specifically, the program code extracts a sentence from the received data, and parses the sentence. The program code extracts and identifies a subject, verb, and object, within the parsed sentence, and further ascertains a verb usage pattern in the parsed sentence. The extracted and identified subject, verb, and object are categorized based on the identified verb usage pattern. Accordingly, program code classifies the sentence based on the categorized subject, verb, and object.

In another aspect, a system is provided to classify a sentence extracted from textual data. To support sentence extraction and classification, a processing unit is provided in communication with data storage, the data storage stores the textual data. A functional unit is provided in communication with memory and the processing unit. The functional unit includes tools to support data classification, the tools include but are not limited to, an extraction manager, an identification manager, and an organization manager. The extraction manager functions to extract at least one sentence from textual data and to parse the extracted sentence. The identification manager identifies the subject, verb, object, and a verb usage pattern associated with the verb in the parsed sentence, and the organization manager categorizes the extracted and identified subject, verb, and object responsive to the identified verb usage pattern. The sentence is classified based on the categorized subject, verb, and object.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
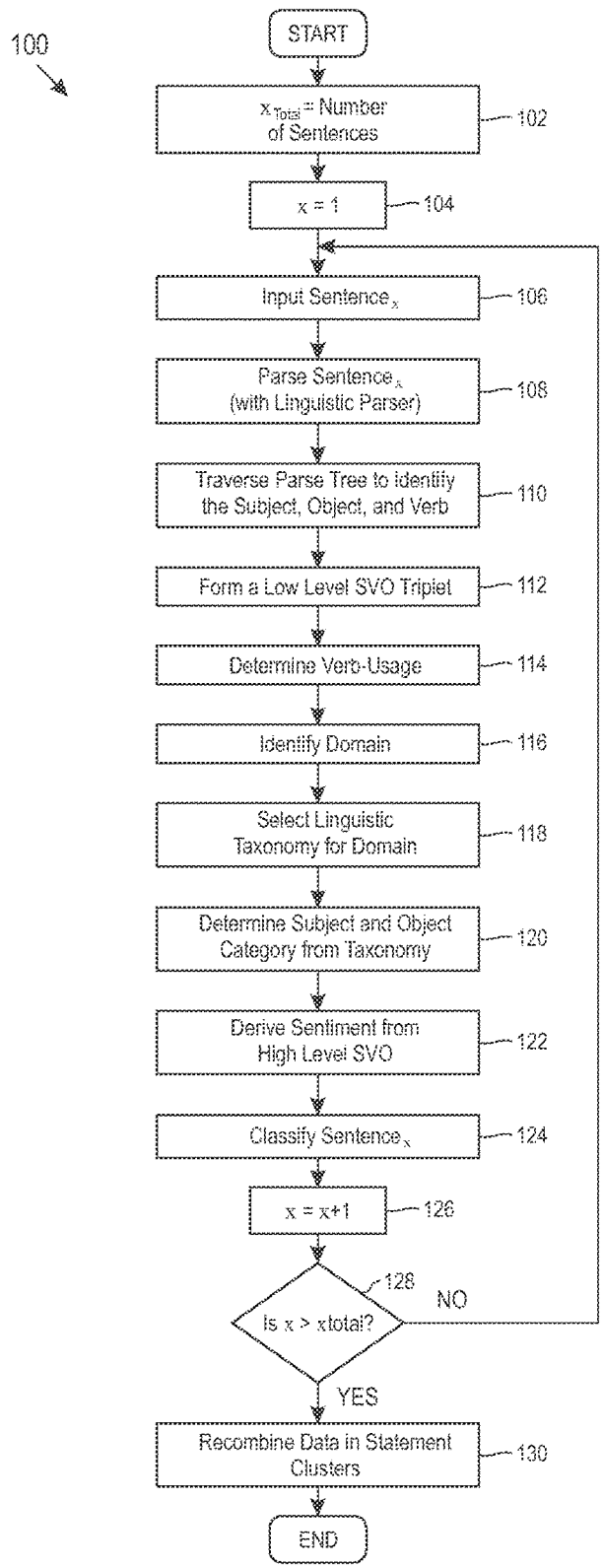
FIG. 1 depicts a flow chart illustrating a method for classifying sentences from textual data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a detection manager, a characterization manager, a visualization manager, and an interaction manager, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

It should be understood that parts of speech is a term that refers to the categories of traditional grammar, of which words are classified according to their function in a sentence. These categories include but are not limited to, a subject, object, and verb. The subject is the driver of a statement, indicating who or what the sentence is about. The verb describes an action or a state of being. The object refers to at least one word that receives the action of the verb or completes the statement made about the subject. This subject, verb, and object, when identified independently from the sentence to which they were extracted and seen in combination, may be referred hereafter as an SVO, or an SVO triplet.

Textual data in the form of statements and assertions in a given domain are analyzed and aggregated. A domain is a source of data that generally pertains to one or more specific data categories. In one embodiment, a domain may be call-center data for specific products or services. FIG. 1 is a flow chart (100) depicting a process for analyzing and aggregating the textual data. As shown, a variable x is initialized (104), where $x_{total}$ is equal to a total number of sentences among a data set (102). A $sentence_x$ is inputted (106). In one embodiment, $sentence_x$ is extracted from a dataset comprised of one or more sentences. The inputted $sentence_x$ is parsed (108). More specifically, required parts of speech such as a noun, object, and verb, are parsed from $sentence_x$. In one embodiment, the $sentence_x$ is parsed using a linguistic parser. Similarly, in one embodiment, the parsing of the sentence creates a parse tree which provides a tag for each token in the sentence. Following the sentence parse at step (108), the parse tree is traversed in order to identify the subject, object, and verb (110). Accordingly, the sentence is parsed and the subject, object, and verb in the parsed sentence are identified.

The identification of the subject, object, and verb at step (110) forms a low level SVO triplet, e.g. subject, verb, object triplet (112). A linguistic taxonomy of the identified verb in combination with parts of speech within the sentence that establish context of the verb is used to determine a verb-usage pattern in $sentence_x$ (114). This determined verb usage pattern identifies the context of, and/or the application of, the parsed verb from $sentence_x$. The domain from which the data is extracted is identified (116). A linguistic taxonomy is determined for the identified domain (118), and the linguistic taxonomy is used to determine a subject category and an object category derived from the identified subject and object respectively (120). This determined subject category and object category, combined with the determined verb-usage pattern, creates a high level SVO triplet.

Following the creation of the high level SVO triplet, a sentiment is derived from the high level SVO triplet (122). In one embodiment, the sentiment is derived from a category of positive, neutral, or negative. The high level SVO triplet, with respect to the derived sentiment, is used to classify $sentence_x$ (124). In one embodiment, the classification at step (124) is also referred to as identification of a statement classification. Following the classification of $sentence_x$, the variable x is incremented (126), and it is determined if all sentences within the data set have been evaluated (128). A negative response is followed by a return to step (106), and a positive response is followed by a termination of the statement cluster evaluation. In one embodiment statement clusters are yielded based on the determined taxonomy of the domain, the high level SVO triplets and derived sentiment. In this embodiment, a tuple is created consisting of the SVO triplet and the derived sentiment. At least one statement cluster is created including multiple tuples sharing a common component. These statement clusters are used to categorize the data statements. In one embodiment, this categorization includes the production of summary reports responsive to the textual analysis. Accordingly, textual data is analyzed and aggregated into statement clusters based on identified SVO triplets in combination with a derived sentiment.

Figure 2:
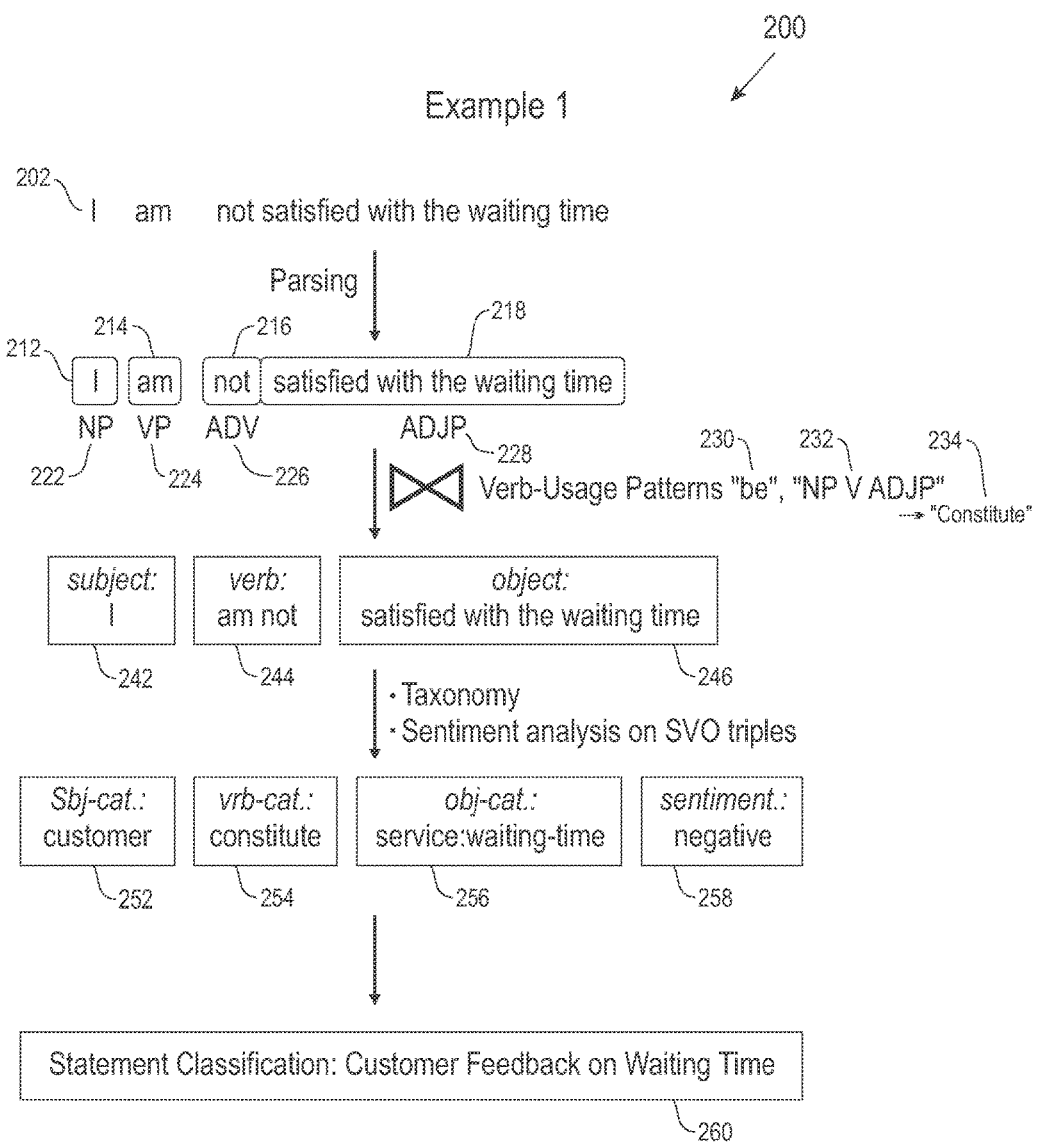
FIG. 2 depicts a block diagram illustrating a first example for classifying a sentence based on a categorized subject, verb, object, and in one embodiment, a derived sentiment.

To further illustrate the aspects taught in FIG. 1, several examples are provided to demonstrate textual evaluation. FIG. 2 is a block diagram (200) illustrating a first example for developing a statement cluster from an extracted sentence. A sentence "I am not satisfied with the waiting time." (202) is parsed. As shown, when parsing the extracted sentence parts of speech of the sentence are separately identified. In this example, the parsing determines "I" (212) as a noun phrase (222), "am" (214) as a verb phrase (224), "not" (216) as an adverb (226), and "satisfied with the waiting time" (218) as an adjective phrase (220). A verb usage pattern of the parsed sentence is joined with the context of the root form of the verb "be" (230) to ascertain the linguistic taxonomy. In one embodiment, the join includes mapping the verb-usage pattern (232) to the verb (214) to ascertain the meaning of the parsed sentence. The join shows the following identified components of the sentence: the subject "I" (242), verb "am not" (244), and object "satisfied with the waiting time" (246). These components in combination are regarded as a low level SVO triplet.

A domain-specific taxonomy is used to determine a subject category "customer" (252) derived from the subject "I" (242), and/or an object category "service: waiting time" (256) derived from the object "satisfied with the waiting time" (246). A verb category "constitute" (254) is determined by the verb usage pattern (234). More specifically, the categorization of the verb is in response to the identified verb usage pattern and based on a reference to an existing linguistic resource to provide a mapping from the verb usage pattern to the categorization of the verb. The linguistic resource provides the mapping from the verb usage pattern to the categorization of the verb. A taxonomy is used to identify the subject category (252), object category (256), and verb category (254). Sentiment is derived from the subject category (252), object category (256), and verb category (254). The verb category, subject category, and object category in combination is regarded as a high level SVO triplet. In this example the derived sentiment (258) is negative as determined from the high level SVO triple. A statement classification (260) indicating "customer feedback on waiting time" is identified based on one or more the following: the subject category "customer" (252), the verb category "constitute", the object category "service: waiting time" (256), and the derived sentiment (258). Accordingly, a classified statement having a high level SVO triplet and a derived sentiment are determined from the example extracted sentence.

Figure 3:
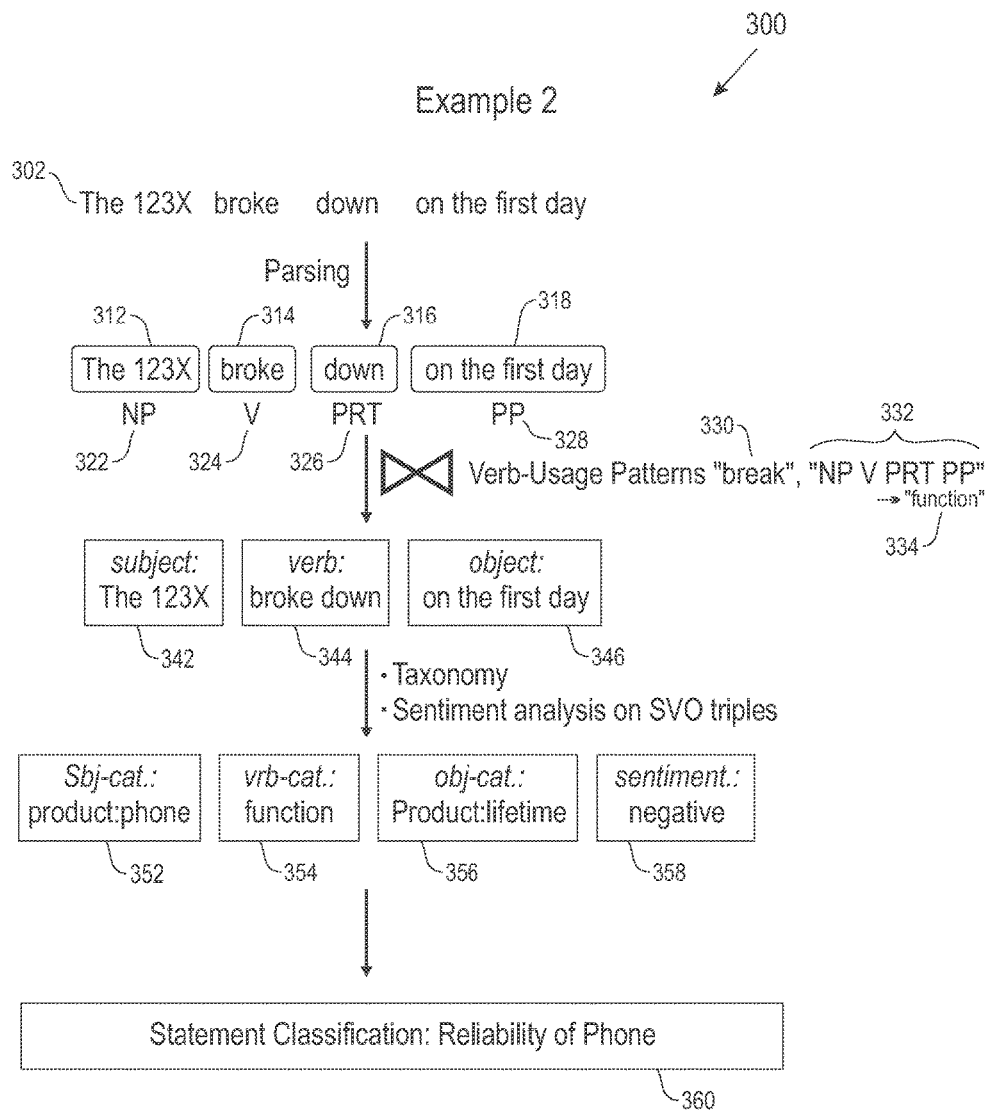
FIG. 3 depicts a block diagram illustrating a second example for classifying a sentence based on a categorized subject, verb, object, and in one embodiment, a derived sentiment.

FIG. 3 is a block diagram (300) illustrating a second example for developing a statement cluster from an extracted sentence. A sentence "The 123X broke down on the first day." (302) is parsed. As shown, when parsing the extracted sentence, parts of speech of the sentence are separately identified. In this example, the parsing determines "The 123X" (312) as a noun phrase (322), "broke" (314) as a verb phrase (324), "down" (316) as a particle (326), and "on the first day" (318) as a preposition phrase (328). A verb usage pattern of the parsed sentence is joined with the context of the root form of the verb "break" (330) to ascertain the linguistic taxonomy. In one embodiment, the join includes mapping the verb-usage pattern (332) to the verb (314) to ascertain the meaning of the parsed sentence. The join shows the following identified components of the sentence: the subject "The 123X" (342), verb "broke down" (344), and object "on the first day" (346). These components in combination are regarded as a low level SVO triplet.

A domain-specific taxonomy is used to determine a subject category "product: phone" (352) derived from the subject "The 123X" (342), and/or an object category "product: lifetime" (356) derived from the object "on the first day" (346). A verb category "function" (354) is determined by the verb usage pattern (334) and a sentiment is derived from the subject category (352), object category (356), and verb category (354). The categorization of the verb is in response to the identified verb usage pattern and based on a reference to an existing linguistic resource to provide a mapping from the verb usage pattern to the categorization of the verb. A linguistic resource provides the mapping from the verb usage pattern to the categorization of the verb. The verb category, subject category, and object category in combination is regarded as a high level SVO triplet. In this example the derived sentiment (358) is negative as determined from the high level SVO triple, and specifically the subject category (342), verb category (344), and object category (346). A statement classification (360) indicating the "reliability of phone" is identified based on one or more the following: the subject category "product: phone" (352), the verb category "function" (354), the object category "product: lifetime" (356), and the derived sentiment (358). Accordingly, a classified statement having a having a high level SVO triplet and a derived sentiment is determined from the example extracted sentence.

Figure 4:
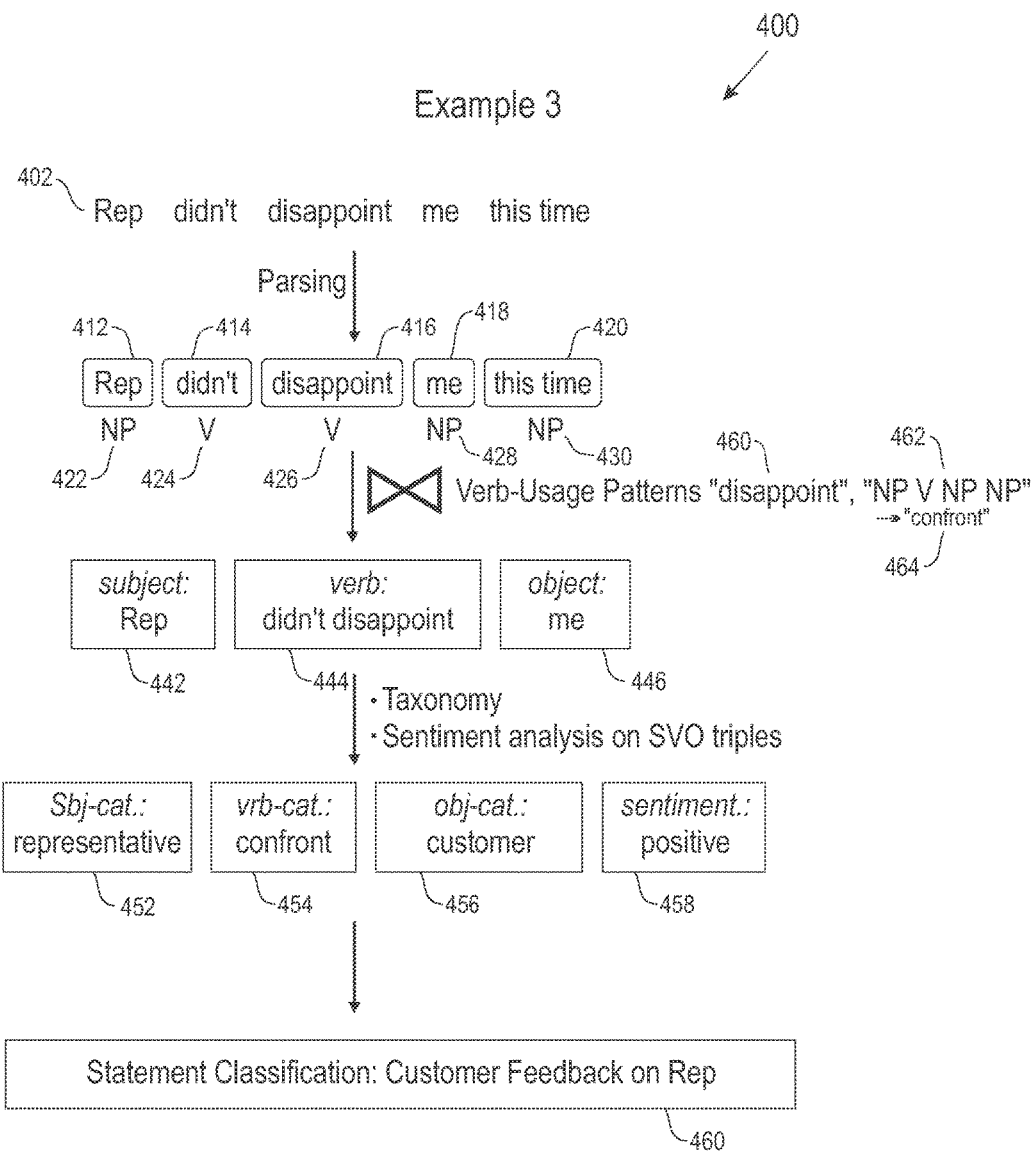
FIG. 4 depicts a block diagram illustrating a third example for classifying a sentence based on a categorized subject, verb, object, and in one embodiment, a derived sentiment.

FIG. 4 is a block diagram (400) illustrating a third example for developing a statement cluster from an extracted sentence. A sentence "Rep didn't disappoint me this time." (402) is parsed. As shown, when parsing the extracted sentence, parts of speech of the sentence are separately identified. In this example, the parsing determines "Rep" (412) as a noun phrase (422), "didn't" (414) as a verb (424), "disappoint" (416) as an additional verb (426), "me" (418) as an additional noun phrase (428), and "this time" (420) as yet another noun phrase (430). A verb usage pattern of the parsed sentence is joined with the context of the root form of the verb "disappoint" (460) to ascertain the linguistic taxonomy. In one embodiment, the join includes mapping the verb-usage pattern (462) to the verb (414) to ascertain the meaning of the parsed sentence. The join shows the following identified components of the sentence: the subject "Rep" (442), verb "didn't disappoint" (444), and object "me" (446). These components in combination are regarded as a low level SVO triplet.

A domain-specific taxonomy is used to determine a subject category "representative" (452) derived from the subject "Rep" (442), and/or an object category "customer" (456) derived from the object "me" (446). A verb category "confront" (454) is determined by the verb usage pattern (464), and a sentiment is derived from the subject category (452), object category (456), and verb category (454). The categorization of the verb is in response to the identified verb usage pattern and based on a reference to an existing linguistic resource to provide a mapping from the verb usage pattern to the categorization of the verb. A linguistic resource provides the mapping from the verb usage pattern to the categorization of the verb. The subject category, verb category, and object category in combination is regarded as a high level SVO triple. In this example the derived sentiment (458) is positive as determined from the high level SVO triple. A statement classification (460) indicating "customer feedback on rep" is identified and includes one or more the following: the subject category "representative" (452), the verb category "confront" (454), the object category "customer" (456), and the derived sentiment (458). Accordingly, a classified statement having a having a high level SVO triplet and a derived sentiment is determined from the example extracted sentence.

Figure 5:
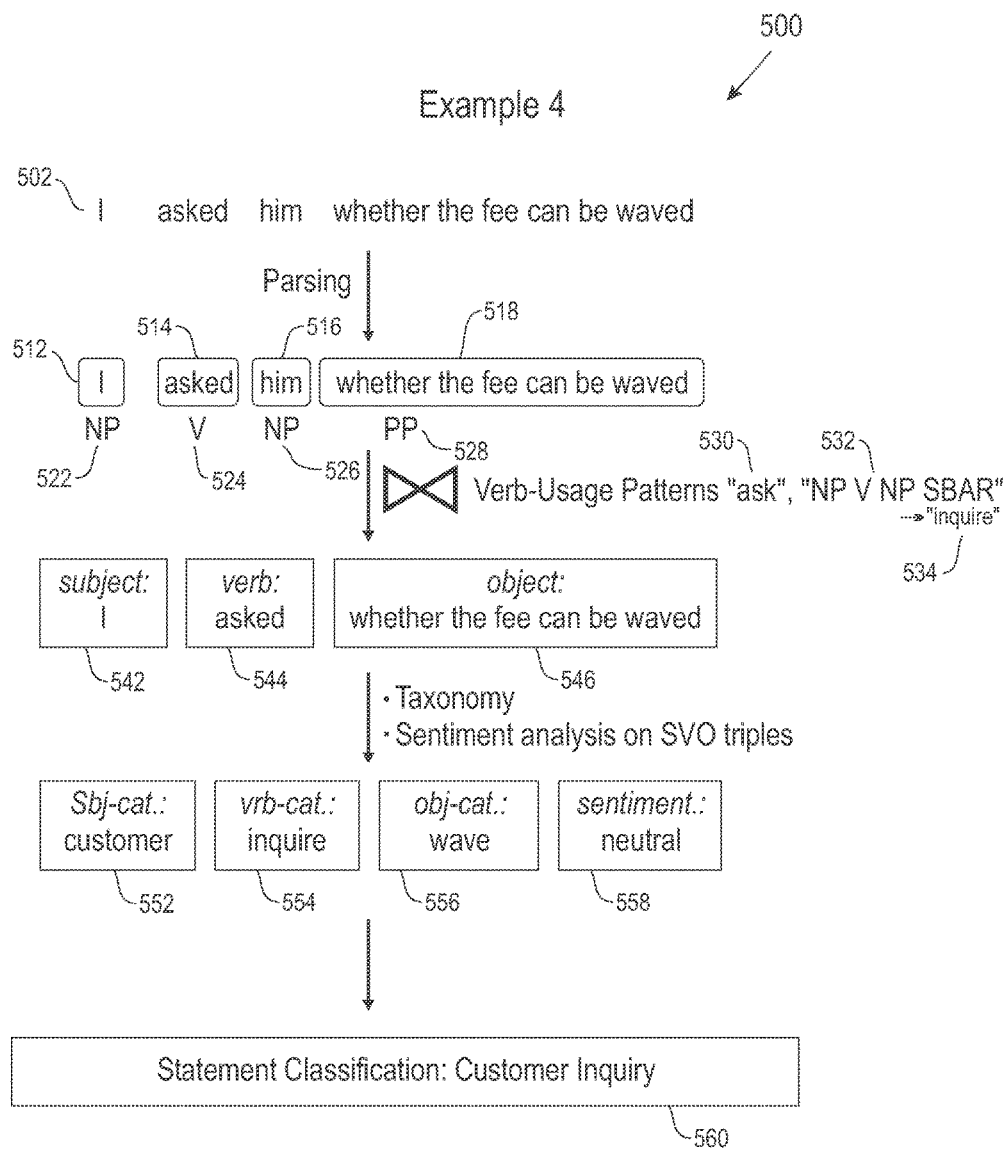
FIG. 5 depicts a block diagram illustrating a fourth example for classifying a sentence based on a categorized subject, verb, object, and in one embodiment, a derived sentiment.

FIG. 5 is a block diagram (500) illustrating a fourth example for developing a statement cluster from an extracted sentence. A sentence "I asked him whether the fee can be waved." (502) is parsed. As shown, when parsing the extracted sentence, parts of speech of the sentence are separately identified. In this example, the parsing determines "I" (512) as a noun phrase (522), "asked" (514) as a verb (524), "him" (516) as an additional noun phrase (526), and "whether the fee can be waved" (518) as a special sentence tag that will identify it as a sub-clause of the sentence (528). In one embodiment, the special sentence tag is ascertained by keyword matching. A verb usage pattern of the parsed sentence is joined with the context of the root form of the verb "ask" (530) to ascertain the linguistic taxonomy. In one embodiment, the join includes mapping the verb-usage pattern (532) to the verb (514) to ascertain the meaning of the parsed sentence. The join shows the following identified components of the sentence: the subject "I" (542), verb "asked" (544), and object "whether the fee can be waved" (546). These components in combination are regarded as a low level SVO triplet.

A domain-specific taxonomy is used to determine a subject category "customer" (552) derived from the subject "I" (542), and/or an object category "wave" (556) derived from the object "whether the fee can be waved" (546). A verb category "inquire" (554) is determined by the verb usage pattern (534) and a sentiment is derived from the subject category (552), object category (556), and verb category (554). The categorization of the verb is in response to the identified verb usage pattern and based on a reference to an existing linguistic resource to provide a mapping from the verb usage pattern to the categorization of the verb. A linguistic resource provides the mapping from the verb usage pattern to the categorization of the verb. The verb category, subject category, and object category in combination is regarded as a high level SVO triplet. In this example the derived sentiment (558) is neutral as determined from the high level SVO triple. A statement classification (560) indicating "customer inquiry" is identified and includes one or more the following: the subject category "customer" (552), the verb category "inquire" (554), the object category "wave" (556), and the derived sentiment (558). Accordingly, a classified statement having a having a high level SVO triplet and a derived sentiment is determined from the example extracted sentence.

Figure 6:
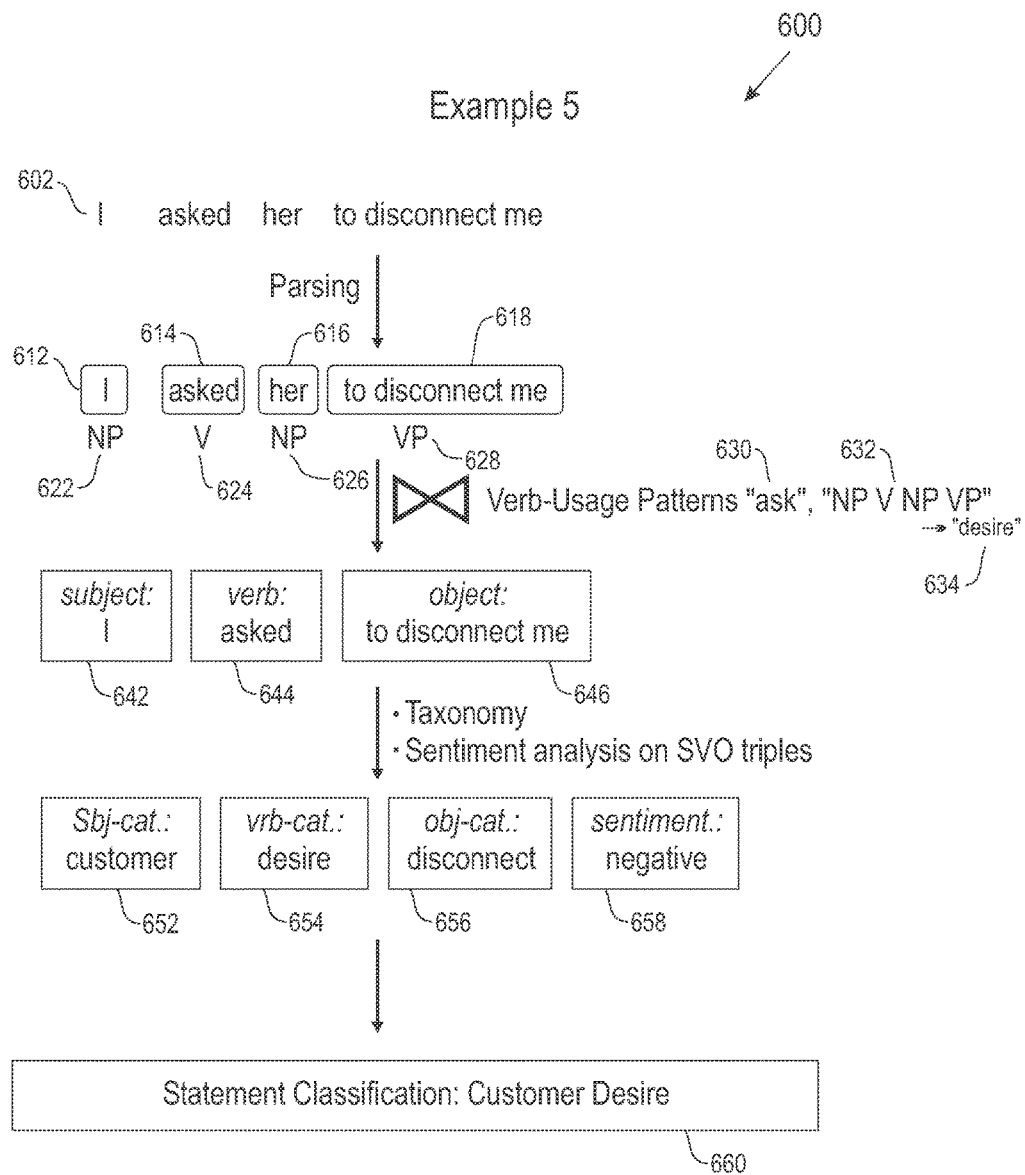
FIG. 6 depicts a block diagram illustrating a fifth example for classifying a sentence based on a categorized subject, verb, object, and in one embodiment, a derived sentiment.

FIG. 6 is a block diagram (600) illustrating a fifth example for developing a statement cluster from an extracted sentence. A sentence "I asked her to disconnect me." (602) is parsed. As shown, when parsing the extracted sentence parts of speech of the sentence are separately identified. In this example, the parsing determines "I" (612) as a noun phrase (622), "asked" (614) as a verb (624), "her" (616) as an additional noun phrase (626), and "to disconnect me" (618) as a verb phrase (628). A verb usage pattern of the parsed sentence is joined with the context of the root form of the verb "ask" (630) to ascertain the linguistic taxonomy. In one embodiment, the join includes mapping the verb-usage pattern (632) to the verb (614) to ascertain the meaning of the parsed sentence. The join shows the following identified components of the sentence: the subject "I" (642), verb "asked" (644), and object "to disconnect me" (646).

A domain-specific taxonomy is used to determine a subject category "customer" (652) derived from the subject "I" (642), and/or an object category "disconnect" (656) derived from the object "to disconnect me" (646). A verb category "desire" (654) is determined by the verb usage pattern (634). While the parsed verb "asked" of this example (614) is the same as the parsed verb from the fourth example (514), and while from them the same taxonomy "ask" is derived, (530) and (630) respectively, different usage patterns are derived for each since both parsed sentences, (532) and (632) respectively, are different. A sentiment is derived from the subject category (652), object category (656), and verb category (654). The categorization of the verb is in response to the identified verb usage pattern and based on a reference to an existing linguistic resource to provide a mapping from the verb usage pattern to the categorization of the verb. A linguistic resource provides the mapping from the verb usage pattern to the categorization of the verb. The verb category, subject category, and object category in combination is regarded as a high level SVO triplet. In this example the derived sentiment (658) is negative as determined from the high level SVO triple. A statement classification (660) indicating "customer desire" is identified and includes one or more the following: the subject category "customer" (652), the verb category "desire" (654), the object category "disconnect" (656), and the derived sentiment (658). Accordingly, a classified statement having a having a high level SVO triplet and a derived sentiment is determined from the example extracted sentence.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
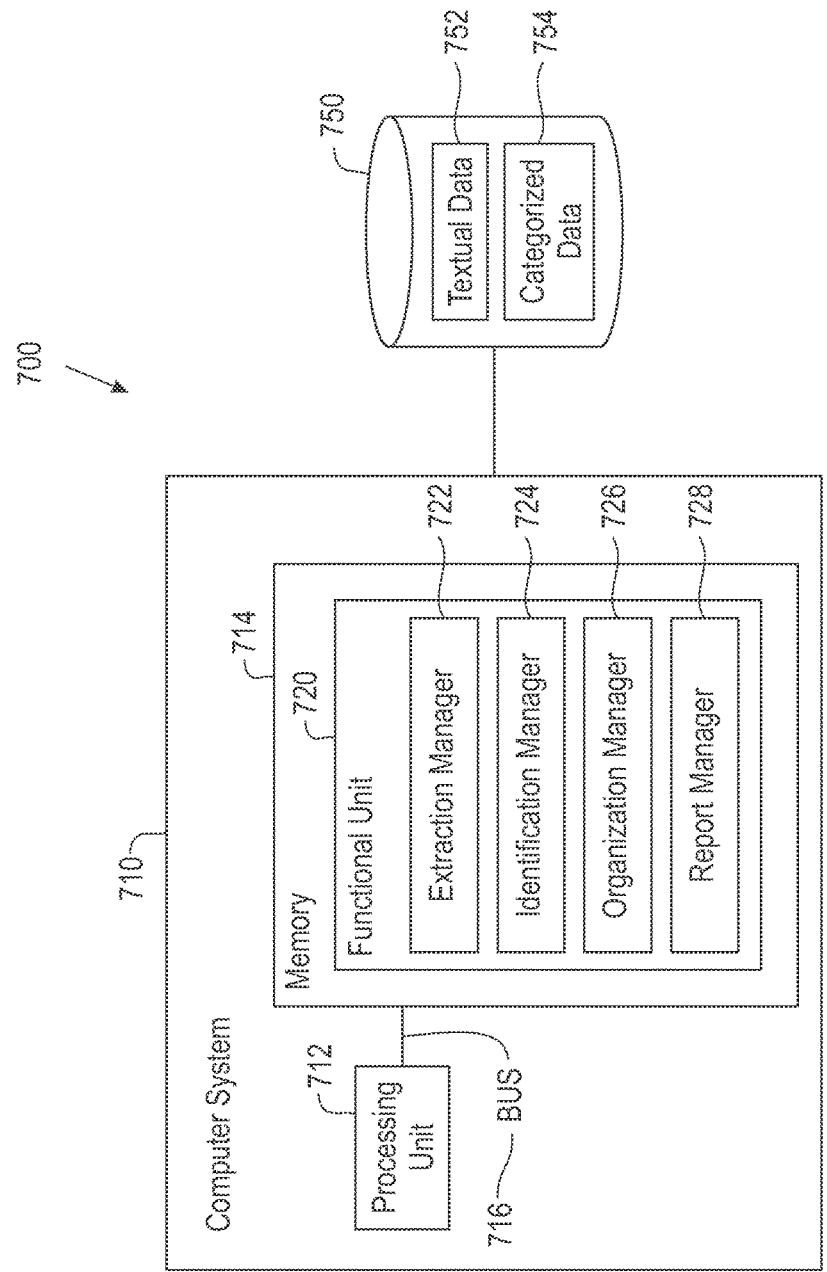
FIG. 7 is a block diagram depicting a system to extract and classify a sentence from a data set.

Referring now to FIG. 7 is a block diagram (700) illustrating a system having tools embedded in a computer system to support autonomous classification of textual data. A computer system (710) is shown in communication with data storage (750). Although the data storage (750) is local to the system (710), in one embodiment, the data storage may be remote from the computer system across a network connection (not shown). Similarly, while one data storage unit (750) is shown, the data storage may include any number of data storage units. The storage system contains stored textual data (752) which is regarded as input. In one embodiment, the storage system is provided with stored categorized data, which is regarded as output (754). In this embodiment, the stored categorized data is organized into statement clusters as will be described in further detail. The computer system (710) is provided with a processing unit (712) in communication with memory (714) across a bus (716). A functional unit (720) is provided with tools to support data characterization and interaction. More specifically, the functional unit (720) is shown embedded in memory (714), which is in communication with the processing unit (712). The tools include, but are not limited to, an extraction manager (722), an identification manager (724), an organization manager (726), and in one embodiment, a report manager (728). Accordingly and as explained in detail below, the tools are provided to support the functionality for data exploration.

The extraction manager (722) is in communication with data storage (750) and functions to extract a sentence from textual data. The extraction manager (722) parses the extracted sentence. More specifically, the extraction manager (722) parses the extracted sentence such that a subject, verb, and object are identified and extracted from the sentence. The identification manager (724) is provided in communication with the extraction manager (722). The identification manager identifies the subject, verb, object, and a verb usage pattern associated with the verb in the parsed sentence. In one embodiment, the identification manager derives a sentiment from the extracted and identified subject, verb, and object within the sentence. In one embodiment, the derived sentiment is determined from a predefined category, the category including positive, neutral, and negative. Accordingly, the extraction manager (722) extracts and parses a sentence from textual data, and the identification manager (724) identifies parts of speech, a verb usage pattern, and a sentiment from the parsed data.

The organization manager (726) is provided in communication with the identification manager (724). The organization manager (726) functions to categorize the extracted and identified subject, verb, and object responsive to the identified verb usage pattern as identified by the identification manager (724). In one embodiment, the organization manager (726) classifies the subject, verb, and object, as identified by the identification manager (724), based upon a domain specific taxonomy associated with the received data.

In one embodiment, the organization manager (726) further classifies the textual data based on the sentiment derived by the identification manager (726). In one embodiment, the report manager (728) is provided in communication with the organization manager (726). The report manager (728) produces an analysis report reflective of the classified sentence, and clusters the received data into a summary report reflective of the analysis report. In one embodiment, this received data is clustered into statement clusters which are produced as output to data storage (754). Accordingly, the organization manager (726) categorizes identified data components including a subject, verb, object, verb usage, and sentiment, and the report manager (728) produces a report reflective of this categorization.

As identified above, the extraction manager (722), identification manager (724), organization manager (726), and report manager (728), hereinafter referred to as tools, function as elements to support autonomous classification of textual data. The tools (722)-(728) are shown residing in memory (714) local to the computing device (710). However, the tools (722)-(728) may reside as hardware tools external to the memory (714), or they may be implemented as a combination of hardware and software. Similarly, in one embodiment, the tools (722)-(728) may be combined into a single functional item that incorporates the functionality of the separate items. As shown herein, each of the tools (722)-(728) are shown local to the computing device (710). However, in one embodiment they may be collectively or individually distributed across a network or multiple machines and function as a unit to autonomously classify textual data. Accordingly, the tools may be implemented as software tools, hardware tools, or a combination of software and hardware tools.

Figure 8:
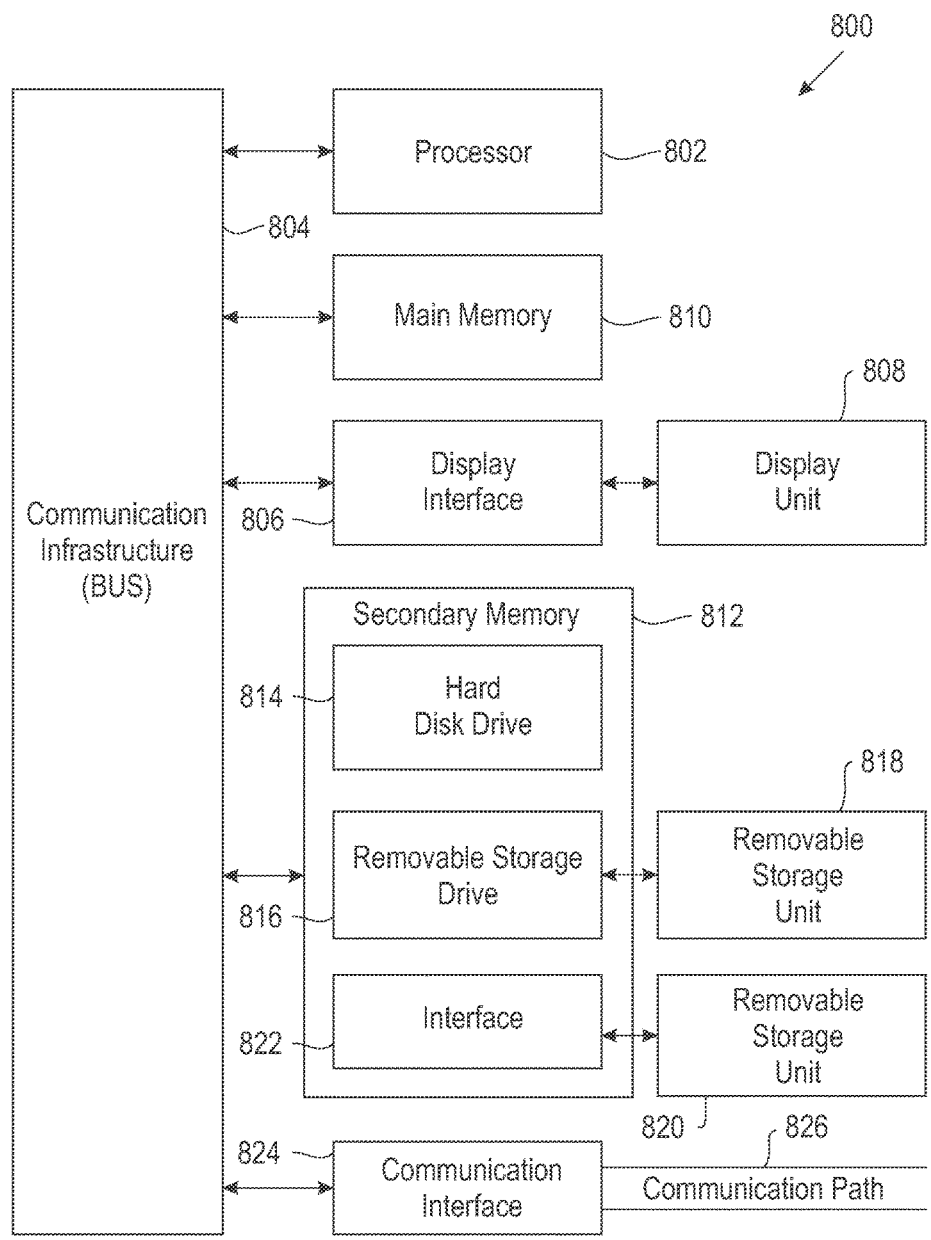
FIG. 8 depicts a block diagram showing a system for implementing an embodiment of the present invention.

Referring now to the block diagram of FIG. 8, additional details are now described with respect to implementing an embodiment of the present invention. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) is in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present invention as discussed herein. In particular, the computer programs, when run, enable the processor (802) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

Alternative Embodiment(s)

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A computer program product for classifying data, the computer program product comprising a computer readable storage device having program code embodied therewith, the program code being executable by a processor to:
receive textual data, and analyze the received data,
wherein the analysis comprises program code to:
identify at least one sentence from the received data;
parse parts of speech of one or more words of the identified sentence using a linguistic parser, including parsing a verb from the at least one parsed sentence, and identifying a verb usage pattern in the at least one identified sentence;
form a low level subject-verb-object (SVO) triplet for the at least one parsed sentence, including identifying a subject, verb, and object of the at least one parsed sentence, wherein the identification of the subject, verb, and object comprises joining the identified verb usage pattern with a form of the identified verb to ascertain linguistic taxonomy;
form a high level SVO triplet for the at least one parsed sentence, including determining a subject category for the subject, a verb category for the verb, and an object category for the object based on the taxonomy; and
classify the at least one parsed sentence based on the high level SVO triplet; and
summarize the analysis of the stored data, including:
produce an analysis report reflective of the analysis; and
convert the produced analysis report into a summary report reflective of the analysis report, including cluster the received textual data into one or more statement clusters, wherein the summary report comprises the statement clusters.

2. The computer program product of claim 1, further comprising program code to derive sentiment from the identified subject, verb, and object.

3. The computer program product of claim 2, wherein the derived sentiment is determined from a predefined category selected from the group consisting of: positive, neutral, and negative.

4. The computer program product of claim 2, wherein the sentence is further classified with respect to the derived sentiment.

5. The computer program product of claim 1, wherein the taxonomy is a domain specific taxonomy associated with the received data.

6. The computer program product of claim 1, wherein the joining of the identified verb usage pattern with a form of the identified verb comprises program code to map the verb usage pattern to the identified verb based on a reference to an existing linguistic resource.

7. The computer program product of claim 1, wherein the form of the identified verb is a root form of the identified verb.

8. The computer program product of claim 1, wherein the parsing comprises program code to create a parse tree to provide a tag for each token in the at least one identified sentence.

9. A system comprising:
   a processing unit in communication with data storage;
   a functional unit having memory and in communication with the processing unit, the functional unit having tools to support data classification, the tools comprising:
      an extraction manager in communication with data storage, the extraction manager to receive textual data, and analyze the received data;
      an identification manager in communication with the extraction manager, the identification manager to:
         identify at least one sentence from the received data;
         parse parts of speech of one or more words of the identified sentence using a linguistic parser, including parse a verb from the at least one parsed sentence, and identify a verb usage pattern in the at least one identified sentence; and
         form a low level subject-verb-object (SVO) triplet for the at least one parsed sentence, including identify a subject, verb, and object of the at least one parsed sentence, wherein the identification of the subject, verb, and object comprises a join of the identified verb usage pattern with a form of the identified verb to ascertain linguistic taxonomy; and
      an organization manager in communication with the identification manager, the organization manager to:
         form a high level SVO triplet for the at least one parsed sentence, including determine a subject category for the subject, a verb category for the verb, and an object category for the object based on the taxonomy; and
         classify the at least one parsed sentence based on the high level SVO triplet; and
         summarize the analysis of the stored data, including:
            produce an analysis report reflective of the analysis; and
            convert the produced analysis report into a summary report reflective of the analysis report, including cluster the received textual data into one or more statement clusters, wherein the summary report comprises the statement clusters.

10. The system of claim 9, further comprising the identification manager to derive sentiment from the identified subject, verb and object.

11. The system of claim 10, wherein the organization manager further classifies the sentence with respect to the derived sentiment.

12. The system of claim 10, wherein the derived sentiment is determined from a predefined category selected from the group consisting of: positive, neutral, and negative.

13. The system of claim 9, wherein the form of the identified verb is a root form of the identified verb.

14. The system of claim 9, further comprising the identification manager to create a parse tree to provide a tag for each token in the at least one identified sentence.

15. The system of claim 9, wherein the taxonomy is a domain specific taxonomy associated with the received data.

16. The system of claim 9, wherein the join of the identified verb usage pattern with a form of the identified verb comprises a map of the verb usage pattern to the identified verb based on a reference to an existing linguistic resource.

* * * * *